(12) United States Patent
Branger

(10) Patent No.: US 8,011,236 B2
(45) Date of Patent: Sep. 6, 2011

(54) METHOD AND DEVICE FOR MONITORING TIRE PRESSURE UTILIZING A REFERENCE VALUE THAT EVOLVES ACCORDING TO A PREDETERMINED FUNCTION OF TIME

(75) Inventor: Laurent Branger, Trevani-Mayotte (FR)

(73) Assignees: Michelin Recherche et Technique, S.A., Granges-Paccot (CH); TRW Automotive U.S., LLC, Farmington Hills, MI (US)

( * ) Notice: Subject to any disclaimer, the term of this patent is extended or adjusted under 35 U.S.C. 154(b) by 520 days.

(21) Appl. No.: 11/910,171

(22) PCT Filed: Apr. 13, 2006

(86) PCT No.: PCT/EP2006/061581
§ 371 (c)(1),
(2), (4) Date: Feb. 4, 2009

(87) PCT Pub. No.: WO2006/108869
PCT Pub. Date: Oct. 19, 2006

(65) Prior Publication Data
US 2009/0308150 A1  Dec. 17, 2009

(30) Foreign Application Priority Data
Apr. 13, 2005 (FR) .................................. 05 03707

(51) Int. Cl.
*B60C 23/02* (2006.01)
(52) U.S. Cl. .............................. 73/146.2; 73/146; 701/79
(58) Field of Classification Search ........................ None
See application file for complete search history.

(56) References Cited

U.S. PATENT DOCUMENTS

| | | | |
|---|---|---|---|
| 4,893,110 A | 1/1990 | Hebert | 340/442 |
| 5,140,851 A | 8/1992 | Hettich et al. | |
| 5,754,102 A | 5/1998 | Yanase et al. | |
| 5,964,509 A * | 10/1999 | Naito et al. | 303/112 |
| 6,087,930 A | 7/2000 | Kulka et al. | |
| 6,175,301 B1 * | 1/2001 | Piesinger | 340/442 |

(Continued)

FOREIGN PATENT DOCUMENTS

DE  3835236 A1  4/1990
(Continued)

OTHER PUBLICATIONS

International Search Report dated Jul. 12, 2006, in PCT/EP2006/061581.

*Primary Examiner* — Lisa M Caputo
*Assistant Examiner* — Jermaine Jenkins
(74) *Attorney, Agent, or Firm* — Fitpatrick, Cella, Harper & Scinto

(57) ABSTRACT

A method of monitoring a pressure (P) of a tire of a motor vehicle involves measuring a pressure (P) of the tire and comparing the measured pressure with at least one reference value ($P_r^M$, $P_r^m$, $P_r$). The reference value ($P_r^M$, $P_r^m$, $P_r$) varies in accordance with a temporal law that depends on at least one of the following parameters: a temporal benchmark, a speech of the vehicle, a temperature of the tire, and a parameter that is based on at least one of the previous three parameters. The reference value ($P_r^M$, $P_r^m$, $P_r$) varies between first and second extreme values.

17 Claims, 1 Drawing Sheet

U.S. PATENT DOCUMENTS

| | | | |
|---|---|---|---|
| 6,445,286 B1 * | 9/2002 | Kessler et al. | 340/442 |
| 6,720,869 B2 * | 4/2004 | Watanabe et al. | 340/442 |
| 6,741,169 B2 * | 5/2004 | Magiawala et al. | 340/438 |
| 6,744,355 B2 * | 6/2004 | Kogure et al. | 340/442 |
| 6,759,952 B2 * | 7/2004 | Dunbridge et al. | 340/444 |
| 7,561,954 B2 * | 7/2009 | Aizawa et al. | 701/79 |

FOREIGN PATENT DOCUMENTS

| | | |
|---|---|---|
| DE | 102 21 723 A | 12/2003 |
| EP | 0 315 885 | 5/1989 |
| EP | 1 167 085 A | 1/2002 |

* cited by examiner

Single Figure

METHOD AND DEVICE FOR MONITORING TIRE PRESSURE UTILIZING A REFERENCE VALUE THAT EVOLVES ACCORDING TO A PREDETERMINED FUNCTION OF TIME

The present invention relates to a method of monitoring the pressure of a tire and a computer implementing the method. It is known that a tire is designed to operate at a nominal pressure and that poor inflation of the tire can cause loss of grip, fuel overconsumption or premature wear of the rubber of the tire.

To limit the risk that a tire is poorly inflated, it is known to monitor the pressure of a tire of a motor vehicle by means of a method in which the pressure of the tire is measured and is compared with at least one reference pressure value.

For example, to detect under-inflation of the tire, the reference value is set at a few tens of millibars below the tire's nominal inflation pressure. If the measured pressure is less than the reference value, the driver of the vehicle is alerted that his tire is under-inflated.

However, when running, the temperature and therefore the pressure of a tire evolve as a function of the rotation speed of the tire. More particularly, the temperature and the pressure of the tire tend to increase with the speed of the vehicle. During the operation of the vehicle, pressure deviations exceeding 100 millibar and possibly up to 300 to 500 millibar between the coldest and the hottest states of the tire are observed in one and the same tire.

This evolution in the pressure of the tire during the operation of the vehicle poses a problem in the choice of reference pressure.

Specifically, if the reference pressure is tailored for monitoring a relatively cold tire, it will turn out to be too low to monitor the pressure of a relatively hot tire.

Additionally, if the reference pressure is tailored for monitoring a relatively hot tire, it will turn out to be too high to monitor the pressure of a relatively cold tire, thus creating the risk of inopportunely alerting the driver.

It is known in particular through document EP 0 315 885 B1 to make corrections related to the internal temperature of the cavity of the tire. However, these temperature measurements are affected by the temperature of the rim on which the tire is mounted, which varies greatly as a function of the running conditions.

The invention is aimed at effectively monitoring the pressure of a motor vehicle tire in the course of the various operating phases of the vehicle, while avoiding the above problems.

For this purpose, an embodiment of the invention is a method of monitoring the pressure of a tire of a motor vehicle, in which the pressure of the tire is measured and is compared with at least one reference value, wherein the reference value may vary according to a temporal law dependent on at least one of the following parameters:
  a temporal benchmark,
  a speed of the vehicle,
  a temperature of the tire, and
  a parameter dependent on at least one of the above three parameters;
and wherein the reference value may vary between first and second extreme values.

Preferably, the deviation between the first and second extreme values is greater than or equal to 100 millibar (mbar) and less than or equal to 200 mbar, and the first and second extreme values correspond to first and second states of the tire such that, in its second state, the tire is hotter than in its first state. Thus, account is taken of the fact that under normal conditions of use the pressure deviations in one and the same tire lie between these two extreme values between the coldest and the hottest states of the tire.

By virtue of the invention, the reference value is highly tailored to the state of the tire, whatever the operating phase of the vehicle, thereby guaranteeing effective detection of an abnormal pressure of the tire without inopportune alerts.

In an optional manner, the temporal law depends on the type of the tire. The structure or the size of the tire are, for example, significant parameters to be taken into account.

According to an aspect of the embodiment, the reference value determines a pressure minimum and, if the measured pressure is less than the reference value, a warning signal is triggered. Thus, the driver of the vehicle is warned when the tire of the vehicle is under-inflated.

According to another aspect of the embodiment, the reference value determines a pressure maximum and, if the measured pressure is greater than the reference value, a warning signal is triggered. Thus, the driver is warned when the tire of the vehicle is over-inflated.

Preferably:
  if the vehicle is running at a speed greater than a predetermined threshold speed, and so long as the second extreme value is not attained, the reference value evolves according to a first predetermined function of time;
  if the vehicle has stopped or is running at a speed less than the predetermined threshold speed, and so long as the first extreme value is not attained, the reference value evolves according to a second predetermined function of time; and
  in the other cases, the reference value is constant.

Specifically, above a predetermined threshold speed, preferably lying between 30 and 50 km/h, the temperature and the pressure of a tire are appreciably influenced by the rotation speed of the tire, while, below this threshold speed, the temperature and the pressure are influenced relatively little by the rotation speed of the tire. In particular, the pressure variation of a tire running at a speed greater than the minimum threshold of 30 km/h is practically always greater than the pressure at the minimum threshold by 100 to 200 mbar. It is therefore particularly beneficial for the temporal law to have the reference value evolve or change in accordance with the speed of the vehicle.

Preferably, the first function of time is an affine function that increases according to a first predetermined director coefficient lying between 500 and 700 mbar/h, and the second function of time is an affine function that decreases according to a second predetermined director coefficient lying between 150 and 250 mbar/h.

It is noted specifically that by defining a piecewise linear temporal law, the reference value varies substantially like the real pressure of the tire.

Preferably:
  a stopped state or running state of the engine of the vehicle is monitored;
  on passing from a running state to a stopped state of the engine, a time, e.g., date, of this stoppage and the reference value at this time, e.g., date, are stored;
  on returning to the running state of the engine, a new reference value is estimated by taking into account the stored reference value and the stored time, e.g., date.

Thus, the new reference value for the restarting of the vehicle is determined as a function of the duration of the stoppage of the vehicle (i.e., how long the engine was stopped) and therefore of the length, e.g., longer or shorter, of a tire cooling period.

Another embodiment of the invention is a device onboard a motor vehicle for implementing the above method for monitoring the pressure of a tire of the motor vehicle, comprising:

- at least one access unit, enabling access to data to be processed;
- at least one calculation unit, allowing rankings and calculations to be performed; and
- implementation instructions, making it possible to execute the method.

Preferably, this device is able to cooperate with means for presenting results.

Another embodiment of the invention is a computer system comprising a device, as above, as well as software comprising code elements for implementing the above method when the software is executed by the computer system.

This software may take the form of a program recorded on a medium readable by a computer system, comprising code elements for implementing the above method.

The invention will be better understood on reading the following description, given solely by way of example, while referring to the appended figure which is a graphic representing the evolution over time of a reference pressure value of a tire of a motor vehicle, of the speed of the vehicle, and of the running state of the engine of the vehicle.

Consideration is given to a motor vehicle tire furnished with a pressure sensor able to measure at any instant a pressure within the tire and to transmit this measurement to a computer onboard the vehicle.

At a given temperature of the tire, the tire is designed to operate in an optimal manner at a pressure lying between a minimum reference value $P_r^m$ and a maximum reference value $P_r^M$. Below $P_r^m$ or above $P_r^M$ it is considered that the tire is respectively under-inflated or over-inflated. The deviation or range between these two values usually is a constant amount, for example of the order of 500 to 800 mbar.

The pressure of the tire is monitored in accordance with a method in which the pressure of the tire is measured and this measurement is compared with at least one reference value, preferably at least one of the two values $P_r^m$ and $P_r^M$.

When the measured pressure of the tire is greater than the maximum reference value $P_r^M$ or less than the minimum reference value $P_r^m$, a signal is triggered to warn the driver of the motor vehicle.

The temperature and the pressure of the tire evolve as the tire rolls. To take account of this, each reference value $P_r^m$ and $P_r^M$ may be varied according to a temporal law dependent on at least one of the following parameters:

- a temporal benchmark,
- a speed of the vehicle,
- a temperature of the tire, and
- a parameter dependent on at least one of the above three parameters.

As the maximum reference value $P_r^M$ is equal to the minimum reference value $P_r^m$ by generally a constant value, the knowledge of the evolution of one of the reference values makes it possible to easily deduce therefrom the evolution of the other. Consequently, the rest of the description will treat only the case of the minimum reference value $P_r^m$, which will be more simply denoted $P_r$.

In general, during the operation of the vehicle, pressure deviations are observed in the tire that may be as much as 100 to 200 mbar between the coldest and the hottest states of the tire.

To take account of this, first $P_r(f)$ and second $P_r(c)$ extreme values are defined, between which the reference value $P_r$ varies. The deviation between these two extreme values is, for example, substantially equal to 150 mbar.

According to a first preferred embodiment, the reference value $P_r$ varies as a function of the speed V of the motor vehicle.

Above a threshold speed, the temperature and the pressure of the tire are appreciably influenced by the rotation speed of the tire, while, below this threshold speed, the temperature and the pressure are influenced relatively little by the rotation speed of the tire.

In accordance with this first embodiment, the temporal law for the variation of the reference value $P_r$ is defined in the following manner:

- if the vehicle is running at a speed V greater than a predetermined threshold speed $V_s$, for example equal to 30 km/h, and so long as the second extreme value $P_r(c)$ is not attained, the reference value evolves according to a first predetermined function of time;
- if the vehicle has stopped or is running at a speed V less than the predetermined threshold speed $V_s$ and so long as the first extreme value $P_r(f)$ is not attained, the reference value evolves according to a second predetermined function of time; and
- in other cases, the reference value $P_r$ is constant.

The first function of time is an affine function increasing according to a first predetermined director coefficient $C_1$ and the second function of time is an affine function decreasing according to a second predetermined director coefficient $C_2$. The director coefficients $C_1$ and $C_2$ preferably are different and preferably are, for example, respectively substantially equal to 600 mbar/h and 200 mbar/h.

If appropriate, it is possible to determine an initial value of $P_r$ when the engine of the vehicle is restarted, by carrying out the following steps:

- a stopped state or running state of the engine of the vehicle is monitored,
- on passing from a running state to a stopped state of the engine, a time, e.g., a date, of this stoppage and the reference value at this time are stored,
- on returning to the running state of the engine, a new or restarting reference value is estimated by taking into account the stored reference value and the time, e.g., the date, stored, as well as the second predetermined function of time. In particular, if the engine stoppage has been sufficiently long for the tire to have cooled sufficiently, the new or restarting reference value is set to the first extreme value $P_r(f)$.

The figure illustrates an exemplary implementation of the first embodiment of the invention. The figure comprises three graphics.

The first graphic, designated by the reference 100, is a curve representing, as a function of time, the state of the vehicle engine when stopped (value 0) or when running (value 1).

The second graphic, designated by the reference 102, is a curve representing the evolution of the speed V of the motor vehicle over time.

The third graphic, designated by the reference 104, comprises a first curve, plotted as a thick line, of the evolution over time of the real pressure P of a tire, and a second curve, plotted as a fine line, of the evolution over time of a minimum reference value $P_r$, whose evolution complies with the temporal law described above.

As shown in the figure, between an instant $t_0$ and an instant $t_1$, the engine of the vehicle has been stopped for a sufficiently long duration for the tire to be relatively cold. Consequently, the reference value is equal to the first extreme value $P_r(f)$.

At an instant $t_1$, the engine of the vehicle passes to the running state and it is considered that the vehicle begins to move without exceeding the threshold speed value $V_s$. The reference value therefore remains equal to the first extreme value $P_r(f)$.

At an instant $t_2$, the speed of the vehicle exceeds the threshold speed value $V_s$. The reference value then increases according to the first predetermined function of time.

At an instant $t_3$, the speed of the vehicle passes below the threshold speed value $V_s$. The reference value then decreases according to the second predetermined function of time.

Up to an instant $t_7$, the reference value evolves in accordance with the temporal law, depending on whether the speed V of the vehicle is greater or less than the threshold speed $V_s$.

At the particular instant $t_7$, the reference value $P_r$ attains the second extreme value $P_r(c)$ and remains equal to this value up to an instant $t_8$, so long as the speed V is greater than the threshold speed $V_s$.

At an instant $t_9$, the engine of the vehicle passes from its running state to its stopped state. It again passes to its running state at an instant $t_{10}$. Between the instants $t_9$ and $t_{10}$, the speed V of the vehicle is zero. Consequently, it is considered that the reference value evolves between these two instants according to the second predetermined function of time. In the example represented, the duration separating the instant $t_9$ from the instant $t_{10}$ is not sufficiently long for the tire to be relatively cold. The reference value at the instant $t_{10}$ is therefore greater than the first extreme value $P_r(f)$.

According to a second embodiment (not represented in the figure), the temporal law depends on a temporal benchmark. For example, the reference value evolves according to the first function of time commencing from when the vehicle engine starts.

According to a third embodiment (not represented in the figure), the temporal law depends on a temperature of the tire. Specifically, because the pressure of the tire varies as a function of its temperature, it is particularly advantageous that the variations in the reference value be dependent on those of the temperature of the tire.

According to a fourth embodiment (not represented in the figure), the temporal law depends on a parameter dependent on a temporal benchmark, a speed of the vehicle, or a temperature of the tire. For example, the rotation speed of the tire is a parameter dependent on the speed of the vehicle.

The invention is not limited to the embodiments described above. Specifically, according to a first variant (not represented in the figure), the temporal law depends furthermore on the type of the tire being monitored. According to a second variant (not represented in the figure), the first and second predetermined functions of time are not affine functions.

The invention claimed is:

1. A method for monitoring a pressure of a tire of a motor vehicle, comprising steps of:
    measuring a pressure of the tire;
    comparing the measured pressure with a reference value that varies in accordance with a temporal law,
        wherein the temporal law depends on at least one of:
            a temporal benchmark,
            a speed of the vehicle, and
            a temperature of the tire, and
        wherein the reference value varies between first and second extreme values;
    enabling the reference value to evolve according to a first predetermined function of time, if the vehicle is running at a speed greater than a predetermined threshold speed and so long as the second extreme value is not attained; and
    enabling the reference value to evolve according to a second predetermined function of time, if the vehicle has stopped or is running at a speed less than the predetermined threshold speed and so long as the first extreme value is not attained.

2. The method of claim 1, wherein the temporal law depends on a type of the tire.

3. The method of claim 1,
    wherein the reference value is a minimum pressure, and
    further comprising a step of triggering a warning signal if the measured pressure is less than the reference value.

4. The method of claim 1,
    wherein the reference value is a maximum pressure, and
    further comprising a step of triggering a warning signal if the measured pressure is greater than the reference value.

5. The method of claim 1, wherein a range between the first and second extreme values is greater than or equal to about 100 mbar.

6. The method of claim 1, wherein a range between the first and second extreme values is less than or equal to about 200 mbar.

7. The method of claim 5, wherein the first and second extreme values correspond to first and second states of the tire, such that the tire is hotter in the second state than in the first state.

8. The method of claim 6, wherein the first and second extreme values correspond to first and second states of the tire, such that the tire is hotter in the second state than in the first state.

9. The method of claim 1, wherein the predetermined threshold speed is greater than or equal to about 30 km/h.

10. The method of claim 1, wherein the predetermined threshold speed is less than or equal to about 50 km/h.

11. The method of claim 1, wherein the first function of time is an affine function that increases according to a first predetermined director coefficient, and wherein the second function of time is an affine function that decreases according to a second predetermined director coefficient.

12. The method of claim 11, wherein the first director coefficient lies between about 500 and 700 mbar/h.

13. The method of claim 11, wherein the second director coefficient lies between about 150 and 250 mbar/h.

14. The method of claim 1, further comprising steps of:
    determining whether the vehicle is in a stopped state or a running state;
    on passing from a running state to a stopped state, storing data on when stoppage occurred and a reference value corresponding to when stoppage occurred; and
    on returning to a running state, using an estimated reference value that takes into account the stored reference value and the stored data of when the stoppage occurred.

15. A device onboard a motor vehicle, the device comprising a processor programmed to implement a method in accordance with claim 1, for monitoring a pressure of a tire of the motor vehicle.

16. A computer system comprising a processor programmed to implement a method in accordance with claim 1, for monitoring a pressure of a tire of a motor vehicle.

17. A computer-readable storage medium storing a program that, when implemented, causes a computer to perform a method in accordance with claim 1, for monitoring a pressure of a tire of a motor vehicle.

* * * * *

UNITED STATES PATENT AND TRADEMARK OFFICE
CERTIFICATE OF CORRECTION

Page 1 of 1

PATENT NO. : 8,011,236 B2
APPLICATION NO. : 11/910171
DATED : September 6, 2011
INVENTOR(S) : Laurent Branger It is certified that error appears in the above-identified patent and that said Letters Patent is hereby corrected as shown below:

At "(74) Attorney, Agent, or Firm" ON COVER PAGE

"Fitpatrick" should read --Fitzpatrick--.

AT COLUMN 4

Line 63, "instant to" should read --instant $t_0$--.

Signed and Sealed this
Eighth Day of November, 2011

David J. Kappos
*Director of the United States Patent and Trademark Office*